United States Patent
Safai et al.

(10) Patent No.: US 10,670,491 B1
(45) Date of Patent: Jun. 2, 2020

(54) OPTICAL SEAL INTEGRITY TESTING

(71) Applicant: The Boeing Company, Chicago, IL (US)

(72) Inventors: Morteza Safai, Newcastle, WA (US); Richard H. Bossi, Renton, WA (US)

(73) Assignee: The Boeing Company, Chicago, IL (US)

( * ) Notice: Subject to any disclaimer, the term of this patent is extended or adjusted under 35 U.S.C. 154(b) by 896 days.

(21) Appl. No.: 13/918,542

(22) Filed: Jun. 14, 2013

Related U.S. Application Data

(60) Provisional application No. 61/773,742, filed on Mar. 6, 2013.

(51) Int. Cl.
G01M 3/38 (2006.01)

(52) U.S. Cl.
CPC ................... G01M 3/38 (2013.01)

(58) Field of Classification Search
CPC ....................................... G01M 3/38
USPC ............................................. 348/86
See application file for complete search history.

(56) References Cited

U.S. PATENT DOCUMENTS

| | | | |
|---|---|---|---|
| 4,510,730 A | 4/1985 | Edmondson | |
| 5,004,346 A | 4/1991 | Kuhel | |
| 5,703,680 A * | 12/1997 | Dunn | G01M 17/027 356/35.5 |
| 5,978,507 A * | 11/1999 | Shackleton | G06K 9/6255 382/195 |
| 6,882,519 B2 * | 4/2005 | Uzawa | H01G 9/10 29/25.03 |
| 7,230,430 B1 * | 6/2007 | Kaiser | G01N 25/20 324/426 |
| 2004/0134259 A1 * | 7/2004 | Haug | G01M 3/363 73/40 |
| 2008/0295579 A1 * | 12/2008 | Safai | G01M 3/363 73/40 |
| 2012/0045127 A1 | 2/2012 | Song et al. | |

FOREIGN PATENT DOCUMENTS

| | | |
|---|---|---|
| DE | 3739166 A1 | 6/1989 |
| WO | 2006056133 A1 | 6/2006 |

* cited by examiner

*Primary Examiner* — Zhubing Ren
*Assistant Examiner* — Jimmy S Lee
(74) *Attorney, Agent, or Firm* — Kunzler Bean & Adamson

(57) ABSTRACT

A system may be provided for optically testing the integrity of a sealed article such as a lithium-ion battery. The system may include a chamber, a pressurizing apparatus that provides a pressure differential between the interior and exterior of the chamber, and an optical imaging apparatus that detects a change in shape of the article in response to provision of the pressure differential. The optical imaging apparatus may be a shearography device, which may be connected to a computing apparatus that receives images before and after provision of the pressure differential and generates a comparison image indicating the change in shape. The comparison image may be manually or automatically analyzed to determine whether the change in shape is significant, indicating the existence of a proper seal.

20 Claims, 5 Drawing Sheets

OPTICAL SEAL INTEGRITY TESTING

CROSS-REFERENCE TO RELATED APPLICATION

This patent application claims the benefit of U.S. Provisional Patent Application No. 61/773,742, filed Mar. 6, 2013, which is incorporated herein by reference.

FIELD

This disclosure relates to optical systems and methods for testing the integrity of a seal, and more particularly, to the use of shearography (e.g., speckle shearing interferometry) techniques to determine whether an article maintains a seal during a change in ambient pressure by measuring surface changes on the article.

BACKGROUND

Many articles exist that need to maintain a generally airtight or hermetic seal in order to function properly. It may be desirable to test the integrity of the seal on a regular basis to determine whether the article is to be replaced and/or repaired. According to conventional methods, the article may be immersed in a pressurized gas such as helium, and then placed in a lower pressure environment in which the gas is generally not present. If the gas has been absorbed into the article, it will be released and detected, indicating a faulty seal.

Such methods, and others known in the art, may be expensive and/or difficult to carry out. It may be desirable to engage in periodic testing of the seal integrity of the article, but repeated performance of such testing may multiply the expense and/or inconvenience.

One type of article for which seal integrity testing may be desired is a battery, or more specifically, a lithium-ion battery. Lithium-ion batteries may generally need to maintain a hermetic seal in order to operate properly. Such a seal may be particularly difficult to maintain with the duty cycle involved in aviation, particularly where the battery may be stored in an un-pressurized part of the aircraft. Thus, the battery may be subjected to repeated reduction of ambient pressure as the aircraft ascends to cruising altitude, and a similar increase of ambient pressure as the aircraft once again descends. Such batteries may be important for the operation of the aircraft's electrical systems.

Accordingly, it may be desirable to regularly check the hermetic seal of such batteries. It may be further desirable for the testing method used to be non-destructive so that batteries that have passed the test may be readily re-used. Further, it may be desirable for the testing method to be rapidly and inexpensively carried out. Yet further, it may be desirable for the testing method to be reliable and accurate so that faulty batteries can be easily detected, and repaired and/or replaced.

SUMMARY

The subject matter of the present application has been developed in response to the present state of the art, and in particular, in response to the problem of, and the usefulness to test articles, such as aircraft batteries, for seal integrity. Accordingly, the subject matter of the present application has been developed to provide an apparatus, system, and method for optically testing the seal integrity of an article, that overcome at least some of the above-discussed shortcomings of prior art techniques.

According to one embodiment, a system may include a chamber sized to contain an article comprising an enclosure, a seal integrity of which is to be tested by the system, the chamber defining an interior and an exterior, a pressurizing apparatus connected to the chamber to provide a pressure differential between the interior and the exterior, and an optical imaging apparatus positioned to detect a change in shape of a surface of the enclosure that occurs in response to provision of the pressure differential.

The article may be a lithium-ion battery, and the enclosure may be a housing of the battery. The optical imaging apparatus may be a shearography (e.g., speckle shearing interferometry) device. The system may further include a light emitting apparatus that projects coherent light toward the lithium-ion battery. The shearography device may detect the change in shape after receiving the coherent light after reflection of the coherent light off of the lithium-ion battery.

The system may further include a computing apparatus connected to the shearography device. The computing apparatus may be programmed to receive and record images generated by the shearography device. The images may include a first image taken by the shearography device prior to provision of the pressure differential, and a second image taken by the shearography device after provision of the pressure differential.

The computing apparatus may further be programmed to compare the first image with the second image to create a comparison image indicating the change in shape. The computing apparatus may analyze the comparison image and, based on results of analyzing the comparison image, indicate to a user whether the housing is sealed. The comparison image may have a plurality of contour features indicating a size of at least one bulge in the surface, wherein the computing apparatus is further programmed to analyze the comparison image by counting the contour features to determine the size. The pressure differential may be a vacuum within the interior of the chamber.

According to one method of testing the seal integrity of an article, the article may first be placed in a chamber defining an interior and an exterior. The article may have an enclosure. An optical imaging apparatus may be positioned to view the article and may generate a first image of the article within the chamber with the optical imaging apparatus, with a first pressure within the interior of the chamber. In some implementations, the first pressure can be ambient or atmospheric pressure, which is equal to the pressure within the exterior of the chamber. A second pressure within the interior of the chamber is provided. The second pressure is different than the first pressure. The second pressure can be greater than, or less than the first pressure. A second image of the article within the chamber may be generated with the optical imaging apparatus, with the second pressure in place. The first and second images may then be compared to detect a change in shape of a surface of the enclosure occurring in response to a transition between the first and second pressures within the interior of the chamber.

The article may be a lithium-ion battery, and the enclosure may be a housing of the battery. The optical imaging apparatus may be a shearography device. The method may further include orienting a light emitting apparatus toward the lithium-ion battery and emitting coherent light with the light emitting apparatus. Generating the first image may include receiving the coherent light in the optical imaging apparatus after reflection of the coherent light off of the lithium-ion battery.

The method may further include recording the first image with a computing apparatus connected to the shearography device and recording the second image with the computing apparatus. The method may further include, in the computing apparatus, comparing the first image with the second image to create a comparison image indicating the change in shape.

The method may further include, in the computing apparatus, analyzing the comparison image and, based on results of analyzing the comparison image, indicating to a user whether the housing is sealed. The comparison image may include a plurality of contour features indicating a size of at least one bulge in the surface. Analyzing the comparison image may include counting the contour features to determine the size.

The method may further include, after providing the second pressure and before generating the second image, waiting for a time interval selected to permit a gas pressure within the enclosure to equalize with gas pressure within the interior of the chamber if the enclosure is no longer sealed. Providing the second pressure may include forming a vacuum within the interior of the chamber relative to the exterior of the chamber. Also, the first pressure within the interior of the chamber may be equal to the pressure within the exterior of the chamber.

According to one embodiment, a system may include a chamber sized to contain a lithium-ion battery comprising a housing, a seal integrity of which is to be tested by the system, the chamber defining an interior and an exterior and a pressurizing apparatus connected to the chamber to provide a vacuum within the interior, relative to the exterior. The system may further include a light emitting apparatus that projects coherent light toward the lithium-ion battery, and a shearography device positioned to receive the coherent light after reflection of the coherent light off of the lithium-ion battery and, based on the coherent light, detect a change in shape of a surface of the housing that occurs in response to the vacuum.

The system may further include a computing apparatus connected to the shearography device. The computing apparatus may be programmed to receive and record images generated by the shearography device. The images may include a first image taken by the shearography device prior to provision of the vacuum, and a second image taken by the shearography device after provision of the vacuum. The computing apparatus may further be programmed to compare the first image with the second image to create a comparison image indicating the change in shape.

The comparison image may have a plurality of contour features indicating a size of at least one bulge in the surface. The computing apparatus may further be programmed to analyze the comparison image by counting the contour features to determine the size and, based on results of analyzing the comparison image, indicate to a user whether the housing is sealed.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
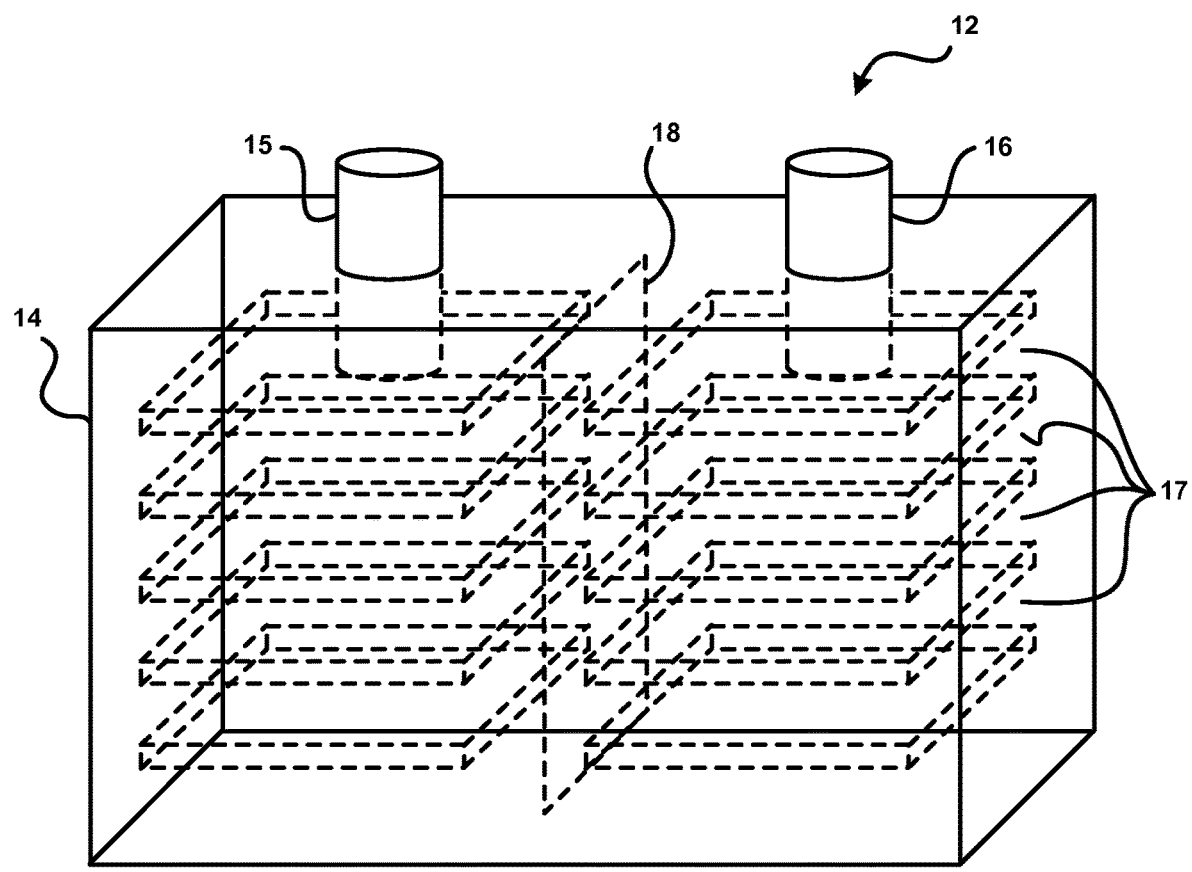
FIG. 1 is a schematic view that illustrates an article in the form of a lithium-ion battery.

Referring to FIG. 1, a schematic view illustrates an article 12 in the form of a lithium-ion battery that may beneficially be tested for seal integrity. The lithium-ion batteries may be of a type commonly used in vehicles such as airplanes (not shown).

The article 12 may have an enclosure that encapsulates and protects its components. The enclosure may take the form of a housing 14 that generally maintains a hermetic seal relative to the environment surrounding the article 12. The housing 14 may contain an anode 15 and a cathode 16, each of which may be formed of parallel plates of a conductive material. The anode 15 and the cathode 16 may be exposed to an electrolyte 17 and a lithium material that cooperate to promote the transport of lithium ions across a separator 18 from the anode 15 to the cathode 16. The result of such transport may be the generation of a potential across the anode 15 and the cathode 16, which may be applied to a load (not shown) such as vehicle circuitry, or more specifically, aircraft circuitry.

Various characteristics of the article 12 may be assessed to help determine that the article 12 is functioning properly. For example, the anode 15, cathode 16, and/or electrolyte 17 may require isolation from ambient moisture and/or air in order to function properly. Thus, the hermetic seal of the housing 14 may be important to the proper functioning of the article 12. Additionally, the level of the electrolyte 17 within the housing 14 and the consistency of the lithium material may also be important factors in the operation of the article 12. All of these characteristics of the article 12 may beneficially be tested on a regular basis to ensure that the article 12 is functioning properly.

Figure 2:
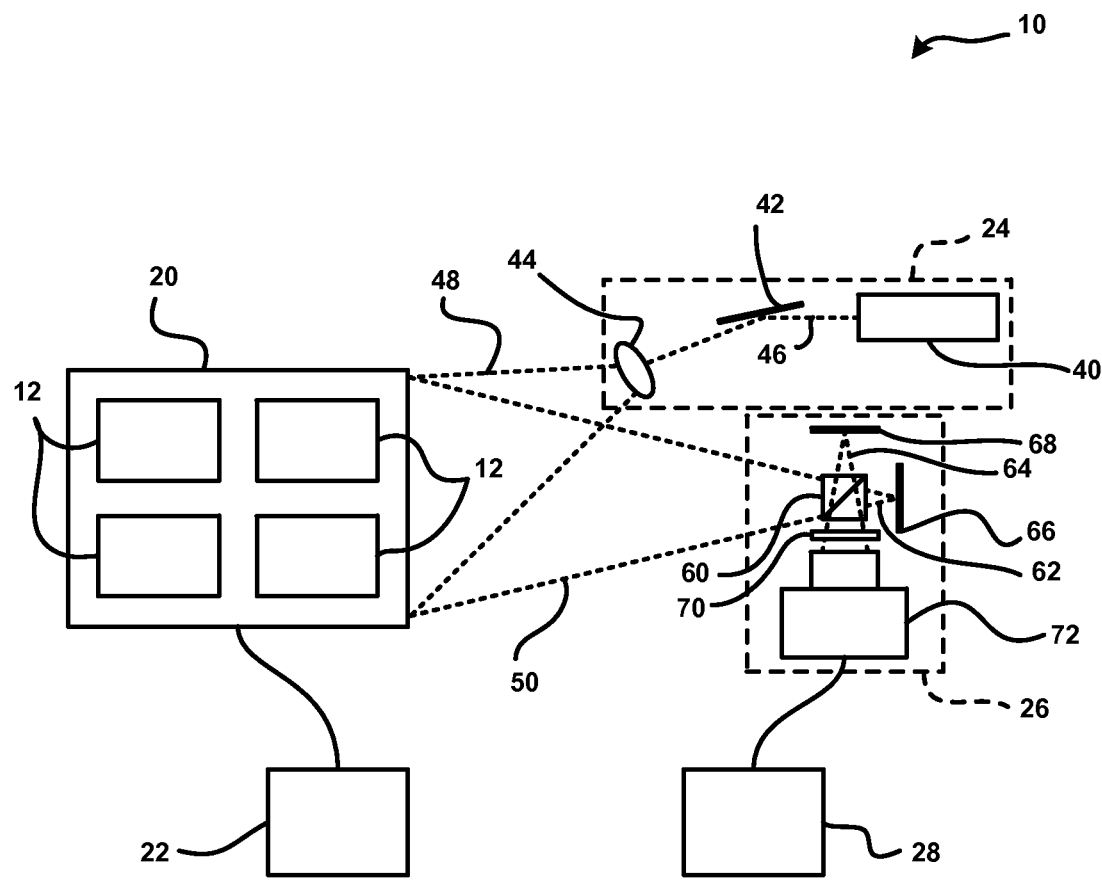
FIG. 2 is a schematic view that illustrates a system for optically testing the seal integrity of an article.

Referring to FIG. 2, a schematic view illustrates a system 10 for optically testing the seal integrity of an article. The system 10 may be designed to measure the seal integrity of one or more articles 12. The articles 12 may be any item for which seal integrity is to be tested. According to one embodiment, the articles 12 are lithium-ion batteries, as described in connection with FIG. 1.

As shown in FIG. 2, the system 10 may include a chamber 20, a pressurizing apparatus 22, a light emitting apparatus 24, an optical imaging apparatus 26, and a computing apparatus 28. In general, the pressurizing apparatus 22 may provide a pressure differential that will cause the exterior surface (e.g., the housing 14) of each of the articles 12 to change in shape. The light emitting apparatus 24 may illuminate the exterior surfaces with coherent light, and the reflected coherent light may be received by the optical imaging apparatus 26, which may form one or more images based on the coherent light received. These images may be processed and/or analyzed by the computing apparatus 28.

Since the view of FIG. 2 is schematic, the chamber 20 and the articles 12 may be shaped much differently than shown. For example, the articles 12 need not be rectangular as shown, but may instead be thin, long shapes, or may be round and/or irregular. The shapes of the various components of FIG. 2 may likewise be much different than those illustrated.

The chamber 20 may be sized to contain one of the articles 12, or for simultaneous testing of multiple articles 12, the chamber 20 may be sized to contain multiple articles 12, such as the set of four illustrated in FIG. 2. The chamber 20 may also have any suitable shape, and may be designed to maintain a hermetic seal under positive or negative pressure relative to ambient air. The chamber 20 may have one or more walls that are translucent, at least for the frequencies of the electromagnetic spectrum that are pertinent to detection of surface shape change by the optical imaging apparatus 26.

The pressurizing apparatus 22 may be designed to induce a pressure differential in the chamber 20. Such a pressure differential may be "high pressure," i.e., the existence of pressure within an interior of the chamber 20 that is greater than that of the exterior of the chamber 20. Alternatively, such a pressure differential may be a "vacuum," i.e., the existence of pressure within the interior of the chamber 20 that is lower than that of the exterior of the chamber. Thus, the pressurizing apparatus 22 may be a vacuum pump or other device that is designed to pump air or another gas into or out of the chamber 20.

The light emitting apparatus 24 may have a number of components that cooperate to illuminate the chamber 20, or more specifically, the one or more articles 12 within the chamber 20 (through the one or more translucent walls of the chamber 20), with coherent light. The light emitting apparatus 24 may include a coherent light source 40, an emitter mirror 42, and a beam expander 44.

The coherent light source 40 may be a laser or other device designed to emit a focused beam 46 of coherent light. The coherent light source 40 may provide the focused beam 46 of coherent light with a frequency, intensity, consistency, coherency, and/or other qualities that make the light suitable for imaging by the optical imaging apparatus 26. The focused beam 46 may include light within the visible spectrum, or may include electromagnetic radiation outside the visible spectrum such as ultraviolet or infrared radiation.

The light emitting apparatus 24 may further include an emitter mirror 42, if desired, that alters the orientation of the focused beam 46 to orient it toward the chamber 20 and the articles 12 to be tested. This may permit the coherent light source 40 to have an orientation that is not directed at the chamber 20. Alternatively, the coherent light source 40 may be oriented to emit the focused beam 46 directly toward the chamber 20, and the emitter mirror 42 may be omitted.

The beam expander 44 may serve to broaden the focused beam 46 to provide an expanded beam 48, which may still comprise coherent light with the desired qualities. The beam expander 44 may be a prism, lens, or other optical device capable of expanding a coherent beam of light. The expanded beam 48 may project over an area broad enough to illuminate the surface of each of the articles 12 to be tested. In the arrangement of FIG. 2, this may entail illuminating only the articles 12 that are closest to the optical imaging apparatus 26, since the remaining articles may be obscured by those closest to the optical imaging apparatus 26.

The articles 12 further from the optical imaging apparatus 26 may be tested separately, for example, by rotating and/or repositioning the articles 12 within the chamber 20 prior to the performance of a second test. Alternatively, the articles 12 may be arranged so that at least a portion of each is visible to the optical imaging apparatus 26 and/or the optical imaging apparatus 26 may be oriented so as to view a portion of the surface of each (for example, by positioning the optical imaging apparatus 26 so that the optical imaging apparatus 26 has line-of-sight on at least a portion of each one of the articles 12. Thus, all of the articles 12 within the chamber 20 may be tested simultaneously. An article 12 need not be fully visible for a successful test; rather, the system 10 may be capable of successfully testing an article 12 of which only a small portion is visible to the optical imaging apparatus 26.

After illuminating the articles 12 to be tested, the coherent light of the expanded beam 48 may reflect from the articles 12 as a reflected beam 50. The reflected beam 50 may be received by the optical imaging apparatus 26. The optical imaging apparatus 26 may have a shearing optic 60 that receives the reflected beam 50 and divides the reflected beam 50 into a first sheared beam 62 and a second sheared beam 64, which may project in orthogonal directions, i.e., directions that are 90° offset from each other. The first sheared beam 62 may reflect off of a first imaging mirror 66, and the second sheared beam 64 may reflect off of a second imaging mirror 68. The first sheared beam 62 and the second sheared beam 64 may then be joined again and optionally, routed through a polarizer 70. Then, the first sheared beam 62 and the second sheared beam 64 may be directed to a camera 72.

The camera 72 may use film, or may have a CCD, CMOS, or other digital light sensor that produces an image from the coherent light of the first sheared beam 62 and the second sheared beam 64. The offset between the first sheared beam 62 and the second sheared beam 64 may permit highly sensitive measurement of the topography of the illuminated surfaces of the articles 12. Thus, even small changes in surface contour can be measured through the use of the optical imaging apparatus 26. One exemplary method by which this may be carried out will be shown and described in connection with FIG. 5.

The computing apparatus 28 may be any type of device capable of receiving and processing image data. As mentioned previously, the images from the camera 72 may be digital, and may thus be amenable to various forms of digital image processing. The computing apparatus 28 may be a microprocessor-based computer, an ASIC, a terminal connected to a network that provides processing functionality, or any other known type of computing apparatus. The computing apparatus 28 may carry out instructions to receive, record, and process the images via software, hardware, or any other method known in the art.

Figure 3:
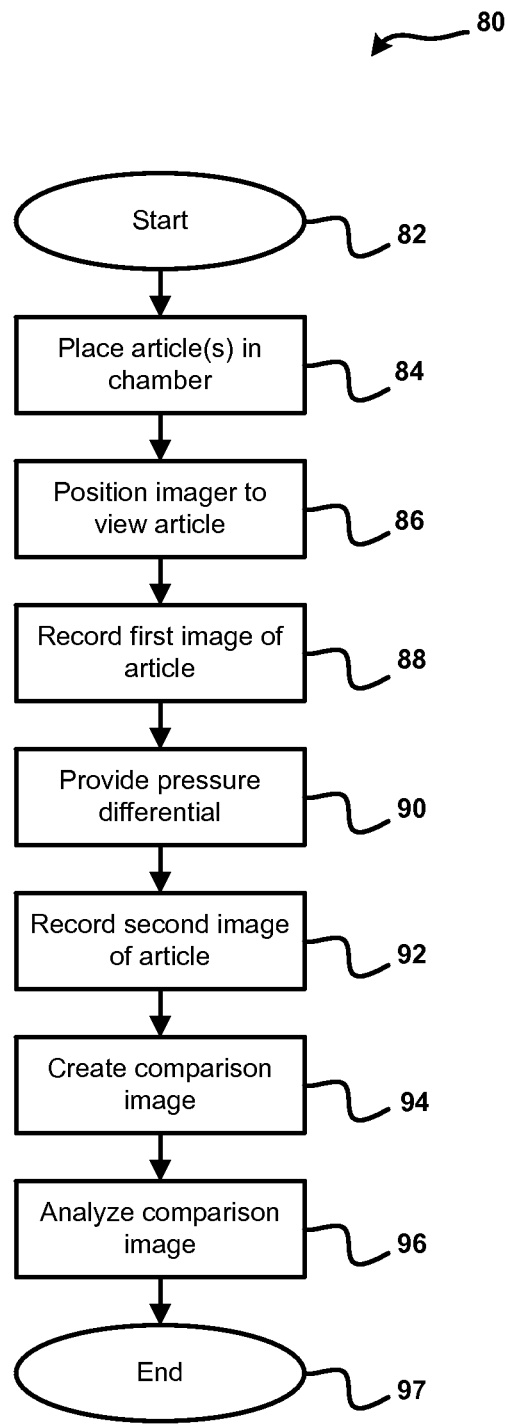
FIG. 3 is a flowchart illustrating a method for optically testing the seal integrity of an article through the use of a system such as that of FIG. 1.

Referring to FIG. 3, a flowchart illustrates a method 80 for optically testing the seal integrity of an article 12 such as a lithium-ion battery through the use of a system such as the system 10 of FIG. 1. In alternative embodiments, the method 80 may be carried out through the use of a system (not shown) different from the system 10 of FIG. 1. Alternatively, the system 10 of FIG. 1 may be used with a method (not shown) different from the method 80. The following description will reference the system 10 of FIG. 1 for clarity.

The method 80 may start 82 with a step 84 in which all of the articles 12 to be tested are placed in the chamber 20. The articles 12 may be separate, contained within a common housing, or otherwise coupled together. The articles 12 may be positioned properly for viewing by the optical imaging apparatus 26. As mentioned previously, the articles 12 may be positioned for simultaneous testing. Alternatively, the articles 12 may be tested in phases, with the articles 12 and/or the optical imaging apparatus 26 moved between phases to ensure that each of the articles 12 can be properly viewed by the optical imaging apparatus 26 in at least one phase of the testing.

Once the articles 12 have been properly placed within the chamber 20, in a step 86, the optical imaging apparatus 26 may be positioned to view the articles 12, if this has not already been done. Similarly, if the light emitting apparatus 24 is not already positioned to illuminate the articles 12, it may be positioned to do so.

Once the light emitting apparatus 24 and the optical imaging apparatus 26 are positioned to illuminate and view the articles 12, respectively, in a step 88, the light emitting apparatus 24 may be activated to illuminate the articles 12 and the optical imaging apparatus 26 may receive the reflected beam 50 and capture a first image of the articles 12. The first image may be recorded by the computing apparatus 28.

After the first image has been captured, the method 80 may proceed to a step 90 in which the pressurizing apparatus 22 is activated to provide the pressure differential within the chamber 20. This pressure differential may consist of a vacuum (i.e., low pressure within the chamber 20, relative to the exterior of the chamber 20) or high pressure (i.e., high pressure within the chamber 20, relative to the exterior of the chamber 20). According to one example, the pressurizing apparatus 22 pumps air out of the chamber 20 to create a vacuum within the chamber 20.

If desired, prior to performance any additional steps, the system 10 may wait for a predetermined period of time to allow the pressure within the articles 12 to equalize with the pressure within the chamber 20. This may occur only if the articles are no longer properly sealed. The predetermined period may be calibrated to the integrity of the seal required. Thus, if a seal of high integrity is required, the predetermined period of time may be long; conversely, if a lower seal integrity is sufficient, the predetermined period may be relatively shorter.

Once the pressure differential has been provided and the predetermined period of time has elapsed, if applicable, the method 80 may proceed to a step 92. In the step 92, the light emitting apparatus 24 may again be activated to illuminate the articles 12 and the optical imaging apparatus 26 may again receive the reflected beam 50 to capture a second image of the articles 12. The second image may also be recorded by the computing apparatus 28.

Once the second images has been recorded, the method 80 may proceed to a step 94 in which the computing apparatus 28 compares the first image with the second image and creates a comparison image based on differences between the two images. This may be done in a variety of ways known in the art for comparing two images. According to one example, the two images may be digital and may be compared pixel-by-pixel. The comparison image may have lighter spaces and/or lighter fringes corresponding to regions of the first and second images where the same pixels, or groups of pixels, have changed significantly between the first and second images.

Once the comparison image has been created, the method 80 may proceed to a step 96 in which the comparison image is analyzed to determine whether significant changes have occurred in the shape of the enclosures of the articles 12 that are supposed to be sealed. For example, where the articles 12 are lithium-ion batteries, analysis of the comparison image determines whether the housings 14 of the lithium-ion batteries, or more specifically the surfaces of the housings 14 that face the optical imaging apparatus 26, have changed significantly in shape. A significant change in shape of an article 12 may be evidence of high seal integrity because it would indicate that the pressure within the article 12 was unable to equalize with that exterior to the article 12.

Returning to the example of the lithium-ion batteries, in the presence of a vacuum, the housing 14 of each of the batteries would be expected to bulge outward if the housing 14 is still sealed. Conversely, in the presence of high pressure within the chamber 20, the housing 14 of each of the batteries would be expected to shrink if the housing 14 is still sealed. Again, if the housing 14 is no longer properly sealed, little or no measurable change in the shape of the housing 14 may occur.

The manner in which the step 96 is conducted will be shown and described in greater detail in connection with FIGS. 4 and 5, as follows. After completion of the step 96, the method 80 may end 97.

Figure 4:
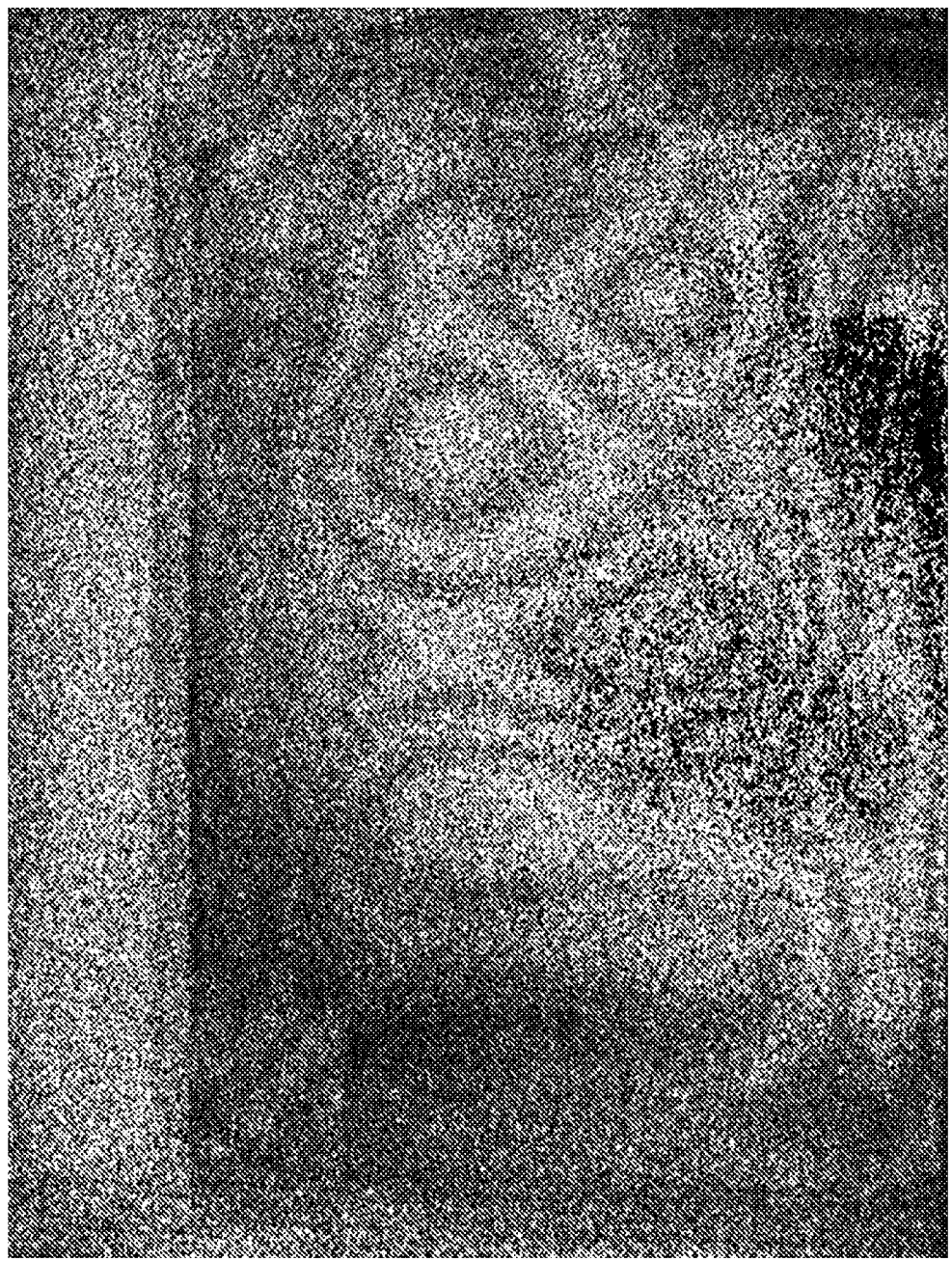
FIG. 4 is a first comparison image that, by way of example, may be produced with the system of FIG. 1.

Referring to FIG. 4, a first comparison image 98 is shown that, by way of example, may be produced with the system 10 of FIG. 1 and/or the method 80 of FIG. 3. The comparison image 98 has dark areas and light areas. The light areas and/or the dark areas may provide rings and/or fringes that may act as contour features that indicate the presence of bulges in the surface of the article 12 being tested. This may be comparable to a topographical map that indicates terrain elevation. The presence of more contour features in a given region may indicate the presence of a larger bulge protruding either into the article 12 or outward from it. As mentioned previously, the first comparison image 98 is based on the difference between the first image and the second image; accordingly, bulges indicated on the first comparison images may generally indicate changes in surface shape, i.e., a bulge that is present in one of the first and second images, but not in the other.

As shown, the first comparison image 98 may have a relatively low contour feature count. This may be determined, for example, by counting the contour features. The presence of relatively few contour may indicate little surface shape change between the capture of the first image and that of the second image (i.e., between the step 88 of the method 80 and the step 92 of the method 80). This, in turn, may indicate the presence of a faulty seal because the pressure within the article 12 was able to equalize with that within the chamber 20 between the capture of the first and second images.

Many different methods may be used to perform the step 96 of analyzing a comparison image such as the first comparison image 98. Visual analysis may be performed by a user to contour features, either in the first comparison image 98 as a whole, or in one or more specific regions of the first comparison image 98, or to measure the size of such features, or the like. Alternatively, computer-implemented methods may be used to automatically perform the analysis, for example, in the computing apparatus 28, with similar techniques or other techniques known in the art of digital image analysis.

Figure 5:
FIG. 5 is a second comparison image that, by way of example, may also be produced with the system of FIG. 1.

Referring to FIG. 5, a second comparison image 99 is shown that, by way of example, may also be produced with the system 10 of FIG. 1 and/or the method 80 of FIG. 3. The second comparison image 99 may have a higher contour feature count and/or a higher contour feature density than that of the first comparison image 98. This may indicate the presence of a greater shape change between the capture of the first image and that of the second image. This, in turn, may indicate the presence of a good seal because the pressure within the article 12 was not able to equalize with that within the chamber 20 between the capture of the first and second images.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present subject matter may be embodied in other specific forms without departing from its spirit or essential characteristics. The described embodiments are to be considered in all respects only as illustrative and not restrictive.

What is claimed is:

1. A system comprising:
a chamber, entirely enclosing and hermetically sealing an article, the article comprising an enclosure configured to seal, within the enclosure, a non-vacuum enclosure pressure, a seal integrity of which is to be tested by the system, wherein the chamber defines an interior and an exterior;
a light emitting apparatus that projects coherent light toward the article, wherein the light emitting apparatus is mechanically disconnected from the chamber and located exteriorly of the chamber;
a pressurizing apparatus connected to the chamber to provide a pressure differential between the interior and the exterior, wherein an interior pressure of the chamber is sufficient to cause the enclosure pressure to bulge or shrink the enclosure having a good seal integrity; and
an optical imaging apparatus that comprises a shearography device, wherein the optical imaging apparatus, including the shearography device, is mechanically disconnected from the chamber and located exteriorly of the chamber, and wherein the optical imaging apparatus is positioned to confirm the seal integrity as good in response to detection of a non-zero change in shape of a surface of the enclosure that occurs in response to provision of the pressure differential.

2. The system of claim 1, wherein the article comprises a lithium-ion battery, and wherein the enclosure comprises a housing of the battery.

3. The system of claim 2, wherein the light emitting apparatus projects coherent light toward the lithium-ion battery, wherein the shearography device detects the change in shape after receiving the coherent light after reflection of the coherent light off of the lithium-ion battery.

4. The system of claim 3, further comprising a computing apparatus connected to the shearography device, wherein the computing apparatus is programmed to receive and record images generated by the shearography device.

5. The system of claim 4, wherein the images comprise a first image taken by the shearography device prior to provision of the pressure differential, and a second image taken by the shearography device after provision of the pressure differential.

6. The system of claim 5, wherein the computing apparatus is further programmed to compare the first image with the second image to create a comparison image indicating the change in shape.

7. The system of claim 6, wherein the computing apparatus is further programmed to analyze the comparison image and, based on results of analyzing the comparison image, indicate to a user whether the housing is sealed.

8. The system of claim 7, wherein the comparison image comprises a plurality of contour features indicating a size of at least one bulge in the surface, wherein the computing apparatus is further programmed to analyze the comparison image by counting the contour features to determine the size.

9. The system of claim 1, wherein the pressure differential comprises a vacuum within the interior of the chamber.

10. A method comprising:
entirely enclosing and hermetically sealing an article in a chamber defining an interior and an exterior, the article comprising an enclosure configured to seal, within the enclosure a non-vacuum enclosure pressure, the enclosure containing an anode and a cathode each comprising parallel plates of conductive material exposed to an electrolyte and separated by an ion-transport separator;
positioning an optical imaging apparatus that comprises a shearography device, at a position located exteriorly of the chamber to view the article, wherein the optical imaging apparatus, including the shearography device, is mechanically disconnected from the chamber;
generating a first image of the article within the chamber with the optical imaging apparatus, with a first pressure within the interior of the chamber;
providing a second pressure within the interior of the chamber, wherein the second pressure is different than the first pressure, wherein at least one of the first pressure and the second pressure is sufficient to cause the enclosure pressure to at least one of bulge or shrink the enclosure of the article having a good seal integrity;
generating a second image of the article within the chamber with the optical imaging apparatus, with the second pressure within the interior of the chamber; and
comparing the first and second images to confirm an integrity of the enclosure of the article as good in response to detection of a non-zero change in shape of a surface of the enclosure occurring in response to a transition between the first pressure and the second pressure within the interior of the chamber.

11. The method of claim 10, wherein the article comprises a lithium-ion battery, and wherein the enclosure comprises a housing of the battery.

12. The method of claim 11, further comprising:
orienting a light emitting apparatus toward the lithium-ion battery; and
emitting coherent light with the light emitting apparatus;
wherein generating the first image comprises receiving the coherent light in the optical imaging apparatus after reflection of the coherent light off of the lithium-ion battery.

13. The method of claim 12, further comprising:
recording the first image with a computing apparatus connected to the shearography device;
recording the second image with the computing apparatus; and
in the computing apparatus, comparing the first image with the second image to create a comparison image indicating the change in shape.

14. The method of claim 13, further comprising, in the computing apparatus:
analyzing the comparison image; and
based on results of analyzing the comparison image, indicating to a user whether the housing is sealed.

15. The method of claim 14, wherein the comparison image comprises a plurality of contour features indicating a size of at least one bulge in the surface, wherein analyzing the comparison image comprises counting the contour features to determine the size.

16. The method of claim 10, further comprising, after providing the second pressure and before generating the second image, waiting for a time interval selected to permit the enclosure pressure within the enclosure to equalize with gas pressure within the interior of the chamber if the enclosure is no longer sealed.

17. The method of claim 10, wherein the first pressure within the interior of the chamber is equal to a pressure within the exterior of the chamber, wherein providing the second pressure comprises forming a vacuum within the interior of the chamber relative to the exterior of the chamber.

18. A system comprising:
a chamber, entirely enclosing and hermetically sealing a lithium-ion battery, the lithium-ion battery comprising a housing configured to seal, within the battery housing, a non-vacuum battery pressure, the battery containing an anode and cathode comprising parallel plates of conductive material exposed to an electrolyte and separated by an ion-transport separator within the housing, a seal integrity of the housing is to be tested by the system, wherein the chamber defines an interior and an exterior;
a pressurizing apparatus connected to the chamber to provide a pressure differential within the interior, relative to the exterior, wherein an interior pressure of the chamber is sufficient to cause the battery pressure to bulge or shrink the housing of the lithium-ion battery having a good seal integrity;
a light emitting apparatus that is mechanically disconnected from the chamber and disposed at a position exteriorly of the chamber, wherein the light emitting apparatus projects coherent light toward the lithium-ion battery; and
a shearography device that is mechanically disconnected from the chamber and disposed at a position exteriorly of the chamber, wherein the shearography device is positioned to receive the coherent light after reflection of the coherent light off of the lithium-ion battery and, based on the coherent light, confirm the seal integrity of the housing of the lithium-ion battery as good in response to detection of a non-zero change in shape of a surface of the housing that occurs in response to the pressure differential.

19. The system of claim 18, further comprising a computing apparatus connected to the shearography device, wherein the computing apparatus is programmed to receive and record images generated by the shearography device, wherein the images comprise a first image taken by the shearography device prior to provision of the pressure differential, and a second image taken by the shearography device after provision of the pressure differential, wherein the computing apparatus is further programmed to compare the first image with the second image to create a comparison image indicating the change in shape.

20. The system of claim 19, wherein the comparison image comprises a plurality of contour features indicating a size of at least one bulge in the surface, wherein the computing apparatus is further programmed to analyze the comparison image by counting the contour features to determine the size and, based on results of analyzing the comparison image, indicate to a user whether the housing is sealed.

\* \* \* \* \*